United States Patent
Harui et al.

[11] Patent Number: 6,072,000
[45] Date of Patent: *Jun. 6, 2000

[54] CURABLE RESIN COMPOSITION FOR USE IN WATER BASED PAINT

[75] Inventors: Nobuo Harui, Minoo; Masataka Ooka, Nara, both of Japan

[73] Assignee: Dainippon Ink and Chemicals, Inc., Tokyo, Japan

[*] Notice: This patent is subject to a terminal disclaimer.

[21] Appl. No.: 08/661,012

[22] Filed: Jun. 10, 1996

Related U.S. Application Data

[62] Division of application No. 08/512,706, Aug. 8, 1995, Pat. No. 5,985,980.

[30] Foreign Application Priority Data

Aug. 12, 1994 [JP] Japan ................... 6-190430
Jul. 10, 1995 [JP] Japan ................... 7-173345

[51] Int. Cl.[7] ................ C08J 2/32; C08K 2/32; C08L 2/32
[52] U.S. Cl. ............. 524/802; 523/411; 524/114; 524/265; 524/266
[58] Field of Search ............. 523/411; 524/114, 524/265, 266, 802

[56] References Cited

U.S. PATENT DOCUMENTS

| | | |
|---|---|---|
| 4,032,487 | 6/1977 | Columbus ................ 523/411 |
| 4,077,932 | 3/1978 | Columbus . |
| 4,590,230 | 5/1986 | Kamada et al. . |
| 4,818,790 | 4/1989 | Ooka et al. . |
| 5,399,601 | 3/1995 | Kusumi et al. . |

FOREIGN PATENT DOCUMENTS

| | | |
|---|---|---|
| 0 173 278 | 8/1985 | European Pat. Off. . |
| 195-29-659 | 7/1996 | Germany . |
| 61-28543 | 2/1986 | Japan . |
| 61-60748 | 3/1986 | Japan . |
| 8-104846 | 4/1996 | Japan . |

*Primary Examiner*—Robert Dawson
*Assistant Examiner*—D. Aylward
*Attorney, Agent, or Firm*—Armstrong, Westerman, Hattori, McLeland and Naughton

[57] ABSTRACT

The present invention proposes highly practical curable resin compositions for use in water based paints, which contain no, or much less organic solvent when compared with current organic solvent based paints, and which produce painted surfaces which have excellent curability and weather resistant properties, as well as excellent resistance to solvents, chemicals and water. These curable resin compositions include a compound combining both epoxy and hydrolyzable silyl groups, and a water based product obtained by dispersing or dissolving in water, a tertiary amino vinyl polymer, a vinyl polymer containing both tertiary amino and acidic groups, or an acidic vinyl polymer, which has been either partially or completely neutralized by an acidic or basic compound.

6 Claims, No Drawings

CURABLE RESIN COMPOSITION FOR USE IN WATER BASED PAINT

This is a division of application Ser. No. 08/512,706 filed Aug. 8, 1995, U.S. Pat. No. 5,985,980.

BACKGROUND OF THE INVENTION

1. Technical Field

The present invention relates to a useful new curable resin composition for use in water based paints. In particular, it relates to a curable resin composition, of particular use in paints, which has excellent weather resistant properties, and furthermore provides excellent curability, and gives excellent resistance against solvents, chemicals and water. The primary constituents of this curable resin composition include; a water based product obtained by dispersing or dissolving in water, a tertiary amino vinyl polymer, or vinyl polymer containing both tertiary amino and acidic functionalities which has been neutralised by an acidic compound, or alternatively, an acidic vinyl polymer, or vinyl polymer containing both tertiary amino and acidic functionalities which has been neutralised by a basic compound, and a compound containing both epoxy and hydrolysable silyl functionalities.

2. Description of the Prior Art

Due to recent worldwide demand for increased environmental conservation measures and improvements in workplace conditions, it is becoming necessary to move away from current organic solvent based paints, to paints which release less organic solvent into the atmosphere. In addition, from an energy conservation point of view, paint resins which will cross link at room temperature would be most attractive.

In order to fulfill these requirements, aqueous emulsions of a copolymer formed from an unsaturated monomer of the ethylene family and a primary or secondary amino alkyl (meta) acrylate, with an epoxy silane coupling agent have been proposed (Japanese Patent Application, First Publication, No. Sho 61-28543), but the cured coating film from such compositions tends to be inferior in terms of its weather resistant properties.

Furthermore, water based adhesive compositions formed by combining an epoxy silane coupling reagent, with a water based polymer formed by emulsion polymerisation of a vinyl monomer containing either carboxyl or tertiary amino functionalites (U.S. Pat. No. 4,077,932), or alternatively water based coating compositions for use with paper or textiles (Japanese Patent Application, First Publication, No. Hei 1-96270) have also been proposed, but the surface obtained from such compositions, in all cases, is inferior, either in terms of water and solvent resistance, or in terms of surface appearance.

Moreover, alkali soluble adhesive compositions formed by combining a surface active agent and an epoxy silane coupling agent, with an aqueous solution of a carboxyl vinyl polymer, which is produced either by polymerisation of a single carboxyl vinyl monomer, or by copolymerisation of two or more different carboxyl vinyl monomers, have also been proposed (Japanese Patent Application, Unpublished, No. Hei 6-41504), but the surface formed from such compositions is inferior, particularly in terms of its resistance to water and alkalinity.

The limitation then, of the aforementioned water based resins of vinyl polymers containing either emulsifiers or surface active reagents is that the resultant surfaces inevitably lack resistance to water and other solvents.

SUMMARY OF THE INVENTION

In view of the above problems, it is an object of the present invention to provide a novel, and highly practical curable resin composition for use in water based paints, which contains no, or very little, organic solvent when compared with current organic solvent based paints, and which yields a cured film which has excellent weather resistant properties, as well as resistance to solvents, chemicals and water. It is a further object of the invention to provide a novel, and highly practical curable resin composition for use in water based paints which will cross link at room temperature.

Accordingly the present invention gives a curable resin composition for use in water based paints comprising; a water based product (A) obtained by dispersing or dissolving in water, a tertiary amino vinyl polymer (I) which has been either partially or completely neutralised by an acidic compound, and a compound (B) containing both epoxy and hydrolysable silyl groups.

Moreover the present invention gives a curable resin composition for use in water based paints comprising; a water based product (C) obtained by dispersing or dissolving in water, a vinyl polymer (II) containing both tertiary amino and acidic functionalities to which has been added sufficient acidic compound so that the molar ratio of acidic functionalities in the added acidic compound to the tertiary amino functionalities in the vinyl polymer (II) is at least 0.1, and a compound (B) containing both epoxy and hydrolysable silyl functionalities. Herein the term molar ratio refers to an equivalence ratio, being the ratio of the equivalent numbers of the respective functionalities.a compound (B) containing both epoxy and hydrolysable silyl groups.

Furthermore the present invention gives a curable resin composition for use in water based paints comprising; a water based product (D) obtained by dispersing or dissolving in water, a vinyl polymer (II) containing both tertiary amino and acidic functionalities to which has been added sufficient basic compound so that the molar ratio of basic functionalities in the added basic compound to acidic functionalities in the vinyl polymer (II) is at least 0.1, and a compound (B) containing both epoxy and hydrolysable silyl groups.

In addition the present invention gives a curable resin composition for use in water based paints comprising; a water based product (E) obtained by dispersing or dissolving in water, an acidic vinyl polymer (III) which has been partially, or completely, neutralised by a basic compound, and a compound (B) containing both epoxy and hydrolysable silyl groups.

Again the present invention gives a curable resin composition for use in water based paints comprising; a water based product (A) obtained by dispersing or dissolving in water, a tertiary amino vinyl polymer (I) which has been either partially or completely neutralised by an acidic compound, a compound (B) containing both epoxy and hydrolysable silyl functionalities, and a compound (F) containing a hydrolysable silyl group and/or a silanol group, but excluding the compound (B).

Again the present invention gives a curable resin composition for use in water based paints comprising; a water based product (C) obtained by dispersing or dissolving in water, a vinyl polymer (II) containing both tertiary amino and acidic groups to which has been added sufficient acidic compound so that the molar ratio of acidic groups in the added acidic compound to the tertiary amino groups in the vinyl polymer (II) is at least 0.1, a compound (B) containing both epoxy and hydrolysable silyl groups, and a compound (F) containing a hydrolysable silyl functionality and/or a silanol functionality, but excluding the compound (B).

Furthermore the present invention gives a curable resin composition for use in water based paints comprising; a water based product (D) obtained by dispersing or dissolving in water, a vinyl polymer (II) containing both tertiary amino and acidic groups to which has been added sufficient basic compound so that the molar ratio of basic groups in the added basic compound to acidic groups in the vinyl polymer (II) is at least 0.1, a compound (B) containing both epoxy and hydrolysable silyl groups, and a compound (F) containing a hydrolysable silyl functionality and/or a silanol functionality, but excluding the compound (B).

In addition the present invention gives a curable resin composition for use in water based paints comprising; a water based product (E) obtained by dispersing or dissolving in water, an acidic vinyl polymer (III) which has been partially or completely neutralised by a basic compound, a compound (B) containing both epoxy and hydrolysable silyl groups, and a compound (F) containing a hydrolysable silyl functionality and/or a silanol functionality, but excluding the compound (B).

Again the present invention gives a curable resin composition for use in water based paints comprising; a water based product (A) obtained by dispersing or dissolving in water, a tertiary amino vinyl polymer (I) which has been either partially or completely neutralised by an acidic compound, a compound (B) containing both epoxy and hydrolysable silyl groups, and a curing catalyst (G).

Moreover the present invention gives a curable resin composition for use in water based paints comprising; a water based product (C) obtained by dispersing or dissolving in water, a vinyl polymer (II) containing both tertiary amino and acidic groups to which has been added sufficient acidic compound so that the molar ratio of acidic groups in the added acidic compound to the tertiary amino groups in the vinyl polymer (II) is at least 0.1, a compound (B) containing both epoxy and hydrolysable silyl groups, and a curing catalyst (G).

Furthermore the present invention gives a curable resin composition for use in water based paints comprising; a water based product (D) obtained by dispersing or dissolving in water, a vinyl polymer (II) containing both tertiary amino and acidic groups to which has been added sufficient basic compound so that the molar ratio of basic groups in the added basic compound to acidic groups in the vinyl polymer (II) is at least 0.1, a compound (B) containing both epoxy and hydrolysable silyl groups, and a curing catalyst (G).

In addition the present invention gives a curable resin composition for use in water based paints comprising; a water based product (E) obtained by dispersing or dissolving in water, an acidic vinyl polymer (III) which has been partially or completely neutralised by a basic compound, a compound (B) containing both epoxy and hydrolysable silyl groups, and a curing catalyst (G).

Again the present invention gives a curable resin composition for use in water based paints comprising; a water based product (A) obtained by dispersing or dissolving in water, a tertiary amino vinyl polymer (I) which has been either partially or completely neutralised by an acidic compound, a compound (B) containing both epoxy and hydrolysable silyl groups, a compound (F) containing a hydrolysable silyl functionality and/or a silanol functionality, but excluding the compound (B), and a curing catalyst (G).

Again the present invention gives a curable resin composition for use in water based paints comprising; a water based product (C) obtained by dispersing or dissolving in water, a vinyl polymer (II) containing both tertiary amino and acidic groups to which has been added sufficient acidic compound so that the molar ratio of acidic groups in the added acidic compound to the tertiary amino groups in the vinyl polymer (II) is at least 0.1, a compound (B) containing both epoxy and hydrolysable silyl functionalities, a compound (F) containing a hydrolysable silyl functionality and/or a silanol functionality, but excluding the compound (B), and a curing catalyst (G).

Furthermore the present invention gives a curable resin composition for use in water based paints comprising; a water based product (D) obtained by dispersing or dissolving in water, a vinyl polymer (II) containing both tertiary amino and acidic groups to which has been added sufficient basic compound so that the molar ratio of basic groups in the added basic compound to acidic groups in the vinyl polymer (II) is at least 0.1, a compound (B) containing both epoxy and hydrolysable silyl groups, a compound (F) containing a hydrolysable silyl functionality and/or a silanol functionality, but excluding the compound (B), and a curing catalyst (G).

In addition the present invention gives a curable resin composition for use in water based paints comprising; a water based product (E) obtained by dispersing or dissolving in water, an acidic vinyl polymer (III) which has been partially or completely neutralised by a basic compound, a compound (B) containing both epoxy and hydrolysable silyl groups, a compound (F) containing a hydrolysable silyl functionality and/or a silanol functionality, but excluding the compound (B), and a curing catalyst (G).

DETAILED DESCRIPTION OF THE INVENTION

The composition formed by combining compounds which contain both epoxy and hydrolysable silyl groups, with specific aqueous solutions or dispersions of either a tertiary amino vinyl polymer, or a vinyl polymer containing both tertiary amino and acidic groups which has been neutralised by an acidic compound, or alternatively, an acidic vinyl polymer, or a vinyl polymer containing both tertiary amino and acidic groups which has been neutralised by a basic compound, contains little organic solvent, displays excellent curability, and also produces a coating film which is highly weather resistant and displays excellent resistance to solvents, chemicals, water and 'yellowing' due to heat.

It was predicted that water based products of acid or base neutralised resins, like those described in this invention, would, upon mixing with compounds containing epoxy and hydrolysable silyl groups react quickly, either by hydrolysis of the hydrolysable silyl functionality followed by a condensation reaction, resulting in consumption of the hydrolysable silyl functionality, or alternatively, by a ring opening reaction of the epoxy functionality, and that as a result, the curability of such mixtures would be inferior, and many of the properties of the resulting coating film would be affected. In actuality however, as detailed above, both the curability and coating film were of an excellent standard.

That is to say the present invention is a curable resin composition for use in water based paints made from, a water based product (A) obtained by dispersing or dissolving in water, a tertiary amino vinyl polymer (I) which has been either partially or completely neutralised by an acidic compound, and a compound (B) containing both epoxy and hydrolysable silyl groups.

Moreover the present invention is a curable resin composition for use in water based paints made from, a water based product (C), obtained by dispersing or dissolving in water, a vinyl polymer (II) containing both tertiary amino and acidic groups to which has been added sufficient acidic compound so that the molar ratio (also referred to hereunder as the molar ratio of the acidic groups in the added acidic compound/tertiary amino groups in the vinyl polymer) of acidic groups in the added acidic compound to the tertiary amino groups in the vinyl polymer (II) is at least 0.1, and a compound (B), containing both epoxy and hydrolysable silyl groups.

Furthermore the present invention is a curable resin composition for use in water based paints made from; a water based product (D) obtained by dispersing or dissolving in water, a vinyl polymer (II) containing both tertiary amino and acidic groups to which has been added sufficient basic compound so that the molar ratio of basic groups in the added basic compound to acidic groups in the vinyl polymer (II) is at least 0.1, and a compound (B), containing both epoxy and hydrolysable silyl groups.

Additionally the present invention is a curable resin composition for use in water based paints made from a water based product (E) obtained by dispersing or dissolving in water, an acidic vinyl polymer (III) which has been partially, or completely, neutralised by a basic compound, and a compound (B) containing both epoxy and hydrolysable silyl groups.

Furthermore, this novel and highly practical curable resin composition for use in water based paints gives a coating film which has excellent weather resistant, solvent resistant, chemical resistant and water resistant properties, and compared to current organic solvent based paints contains less or no organic solvent.

In the production of the curable resin composition for use in water based paints described in this invention, a vinyl polymer is used as the required base constituent of the resin, that is, the required film forming constituent. Representative examples of this vinyl polymer include acrylic polymers, aromatic vinyl polymers, vinyl ester polymers and fluoro olefin polymers.

Furthermore, of these various vinyl polymers, acrylic polymers and fluoro olefin polymers are particularly suitable.

Of these various vinyl polymers we will firstly explain the aforementioned water based product (A), obtained by dispersing or dissolving in water, a tertiary amino vinyl polymer (I) which has been either partially or completely neutralised by an acidic compound.

The aforementioned tertiary amino vinyl polymer (I) can be easily produced by standard methods. For example, (1) a method involving copolymerising a tertiary amino vinyl monomer with other co-polymerisable vinyl monomer, or (2) a method as is described in Japanese Patent, First Publication No. Sho 59-56243, involving dehydrative imidisation processing following the addition reaction of a compound containing both tetiary amino and primary amino groups to a vinyl polymer containing an acid anhydride functionality.

There are various suitable production methods, but of these, method (1) above is the most simple and convenient to carry out, and is thus most suitable.

Particularly suitable examples of the tertiary amino vinyl monomer {hereafter abbreviated as (a-1)} used to produce the tertiary amino vinyl polymer (I) described in production method (1) above include the various (meta) acrylic acid ester monomers such as 2-dimethylamino ethyl (meta) acrylate, 2-diethylamino ethyl (meta) acrylate, 3-dimethylamino propyl (meta) acrylate, 3-diethylamino propyl (meta) acrylate, N-(2-(meta) acryloyl oxyethyl) piperidine, N-(2-(meta) acryloyl oxyethyl) pyrrolidine and N-(2-(meta) acryloyl oxyethyl) morpholine; the various aromatic monomers such as 4-(N,N-dimethylamino) styrene, 4-(N,N-diethylamino) styrene and 4-vinyl pyridine; the various acrylamide monomers such as N-(2-dimethylamino ethyl) (meta) acrylamide, and N-(3-dimethylamino propyl) (meta) acrylamide; and the various vinyl ether monomers such as 2-dimethylamino ethyl vinyl ether, 2-diethylamino ethyl vinyl ether, 3-dimethylamino propyl vinyl ether, 3-diethylamino propyl vinyl ether, 4-dimethylamino butyl vinyl ether, and 6-dimethylamino hexyl vinyl ether.

Particularly representative examples of the other vinyl monomer {hereafter abbreviated as (a-2)} to be copolymerised with the tertiary amino vinyl monomer (a-1) mentioned above include, the various meta acrylic acid esters such as methyl (meta) acrylate, ethyl (meta) acrylate, n-propyl (meta) acrylate, iso-propyl (meta) acrylate, n-butyl (meta) acrylate, iso-butyl (meta) acrylate, tert-butyl (meta) acrylate, 2-ethylhexyl (meta) acrylate, lauryl (meta) acrylate, cyclohexyl (meta) acrylate, benzyl (meta) acrylate, 2-hydroxyethyl (meta) acrylate, 2-hydroxypropyl (meta) acrylate, 2-hydroxybutyl (meta) acrylate, and 4-hydroxybutyl (meta) acrylate; the various unsaturated di-acidic alkyl esters such as dimethyl maleate, dimethyl fumarate, dibutyl fumarate and dimethyl itaconate; the various vinyl monomers containing a carboxylic acid amide functionality such as N,N-dimethyl (meta) acrylamide, N-alkoxymethyl (meta) acrylamides, diacetone (meta) acrylamide, and N-methylol (meta) acrylamide; the various crotonic acid esters such as methyl crotonate, ethyl crotonate, and n-butyl crotonate; the various vinyl esters such as vinyl acetate, vinyl benzoate, and Veova (a branched chain mono carboxyl vinyl ester produced by Shell Corporation, Holland); the various vinyl monomers containing nitrile functionality such as acrylonitrile; the various (per)fluoroalkyl vinyl monomers such as fluoroalkyl (meta) acrylates, perfluoroalkyl (meta) acrylates, perfluoro cyclohexyl (meta) acrylate, di-perfluoro cyclohexyl fumarate, and N-isopropyl perfluorooctane sulfonarnide ethyl (meta) acrylate; the various vinyl monomers containing polysiloxane functionality such as $CH_2=CHCOO\ (CH_2)_3\ [Si\ (CH_3)_2O]_n$ $Si\ (CH_3)_3$, $CH_2=C\ (CH_3)\ COOC_6H_4\ [Si\ (CH_3)_2]_n\ Si\ (CH_3)_3$, $CH2=C\ (CH_3)\ COO\ (CH_2)_3\ [Si\ (CH_3)_2O]_n\ Si\ (CH_3)_3$, $CH_2=C\ (CH_3)\ COO\ (CH_2)_3\ [Si\ (CH_3)\ (C_6H_5)\ O]_n\ Si\ (CH_3)_3$ and $CH_2=C\ (CH_3)\ COO\ (CH_2)_3\ [Si\ (C_6H_5)_2O]_n\ Si\ (CH_3)_3$ (Note that n should be zero, or any integer between 1 and 130); the various halogenised olefins such as vinyl chloride, vinylidine chloride, vinyl fluoride, vinylidine fluoride, tetrafluoro ethylene, hexafluoro propylene, and chloro trifluoro ethylene; the various aromatic vinyl monomers such as styrene, α-methyl styrene, p-tert-butyl styrene, and vinyl toluene; and the various vinyl ethers such as ethyl vinyl ether, n-propyl vinyl ether, iso-butyl vinyl ether, 2-ethylhexyl vinyl ether, cyclohexyl vinyl ether, cyclopentyl vinyl ether, 2-hydroxybutyl vinyl ether, 4-hydroxybutyl vinyl ether, 6-hydroxybutyl vinyl ether, 6-hydroxyhexyl vinyl ether.

Furthermore, monomers containing a polyether segment such as polyethylene glycol mono (meta) acrylate, mono alkoxy polyethylene glycol (meta) acrylate, polypropylene glycol mono (meta) acrylate, polytetramethylene glycol mono (meta) acrylate, mono alkoxy polypropylene glycol (meta) acrylates, and mono alkoxy polypropylene glycol (meta) acrylates may also be used with no loss in the weather resistant or water resistant properties of the final product.

In order to produce the vinyl polymer (I) any of the aforementioned monomers can be polymerised by any of the standard methods, but radical polymerisation in solution is the simplest and most convenient method, and is thus particularly recommended.

Particular suitable solvents to use for this reaction include, the various hydrocarbon solvents such as toluene, xylene, cyclohexane, n-hexane, and octane; the various alcohol solvents such as methanol, ethanol, iso-propanol, n-butanol, iso-butanol, sec-butanol, ethylene glycol monomethyl ether, ethylene glycol mono ethyl ether, ethylene glycol Imnono iso-propyl ether, and ethylene glycol monobutyl ether; the various esters such as methyl acetate, ethyl acetate, n-butyl acetate, and amyl acetate; and the various ketone solvents such as acetone, methyl ethyl ketone, methyl iso-butyl ketone, and cyclohexanone. All of these solvents may be used separately or in mixtures of 2 or more solvents. Water may also be added.

Polymerisation can be carried out by normal methods, using the selected solvent and any well known radical polymerisation initiators such as azo or peroxide compounds. Furthermore, if required, chain transfer reagents such as lauryl mercaptan, octyl mercaptan, dodecyl mercaptan, 2-mercapto ethanol, thioglycolic acid octyl, 3-mercapto propionic acid, and α-methyl styrene dimer may be used as molecular weight regulating reagents.

A tertiary amino vinyl polymer (I) produced in this way should contain between about 0.03 and 2.5 moles of tertiary amino groups per 1000 grams of solid material, with between 0.05 and 1.5 moles being preferable, and between 0.05 and 0.5 moles being most suitable. Furthermore, the average molecular weight for the polymer (I) should generally be in the range 500–100,000, and preferably in the range 1000–30,000.

Moreover, in cases where hydroxyl functionality is introduced into the tertiary amino vinyl polymer (I), by for example using a monomer containing a hydroxyl group as a comonomer, then the curability of this invention's final composition, which will contain the water based product (A) formed from this polymer (I) as the constituent necessary for the formation of the coating film, can be improved one step, producing a coating film which has even better external appearance, even better resistance to solvents, and an even greater level of hardness.

In those instances where hydroxyl functionality is introduced into the tertiary amino vinyl polymer (I), then 1000 grams of solid material should contain between 0.04 and 2 moles, and preferably between 0.08 and 1.2 moles of hydroxyl groups.

By adding an acidic compound to the tertiary amino vinyl polymer (I) formed by the method mentioned above, the tertiary amino groups in the polymer are partially, or completely neutralised, and a polymer which is soluble, or dispersible in water is generated.

Particularly representative acidic compounds which can be used in this instance include carboxylic acids with between 1 and 10 carbon atoms such as formic acid, acetic acid, propionic acid, butyric acid, 2-methyl butyric acid, iso-valeric acid, trimethyl acetic acid, glycolic acid and lactic acid; mono- or dialkyl esters of phosphoric acid such as phosphoric acid monomethyl ester, phosphoric acid dimethyl ester, phosphoric acid mono-iso-propyl ester, phosphoric acid di-iso-propyl ester, phosphoric acid mono2-ethylhexyl ester, and phosphoric acid di-2-ethylhexyl ester; organic sulfonic acids such as methanesulfonlic acid, propanesulfonic acid, benzenesulfonic acid, dodecyl benzenesulfonic acid; and various inorganic acids such as hydrochloric acid, sulphuric acid, nitric acid and phosphoric acid. Among the above acidic compounds however, the carboxylic acids are the most suitable.

The quantity of acidic compound to be added to the polymer, should be at least enough to generate dispersibility in the vinyl polymer (I) outlined above, and the molar ratio of the number of acidic groups in the added acidic compound to the number of amino groups in the polymer, in other words the equivalence ratio: acidic groups in acid I tertiary amino groups in polymer (I), should be 0.1 or greater, but in order not to lose the properties of the coating film generated, a ratio of between 0.1 and 3 is preferred, and a ratio of between 0.1 and 2 is most suitable.

The previously mentioned water based product (A), can be generated from the thus produced neutralised vinyl polymer (I), using various standard methods. For example, water can be simply added to the neutralised material, or alternatively, the material added to water to produce the water based product.

Furthermore, the water based product (A) can be produced, as required, with either partial, or complete removal of the organic solvent used in the production of the vinyl polymer (I), by removing the solvent under temperature, or under reduced pressure.

Next, we will explain the previously mentioned water based product (C), obtained by dispersing or dissolving in water, a vinyl polymer (II) containing both tertiary amino and acidic groups to which has been added sufficient acidic compound so that the molar ratio of acidic groups in the added acidic compound to tertiary amino groups in the vinyl polymer is at least 0.1.

This vinyl polymer (II) containing both tertiary amino and acidic groups can be produced by various standard means. For example, (3) a mixture of monomers containing a tertiary amino vinyl monomer and an acidic vinyl monomer can be polymerised, (4) as presented in Japanese Patent, First Publication, No. Sho 59-56243, a vinyl polymer containing a carboxylic acid anhydride functionality can be reacted with a compound which contains a tertiary amino functionality and a functionality with an active hydrogen, (5) a vinyl polymer containing hydroxyl and tertiary amino groups can be reacted with a dicarboxylic acid anhydride, or (6) a mixture of monomers containing a tertiary amino vinyl monomer, and a vinyl monomer containing a blocked acid functionality such as a trialkyl silyl ester functionality, a hemiacetyl ester functionality, or a tert-butyl ester functionality, which can easily be converted to a free acid functionality by the action of acid, heat or water, can be polymerised, producing a vinyl polymer with tertiary amino and blocked acid groups, which can then have the blocked acid groups converted to free acid groups. Among the methods outlined, method (3) is particularly recommended, because it is the most simple and convenient. The tetiary amino vinyl monomer required to produce the vinyl polymer (II) containing both tertiary amino and acidic groups by method (3) above, can be any of the various tertiary amino vinyl monomers (a-1) mentioned previously as possible precursors to the tertiary amino vinyl polymer (I).

Furthermore, particularly suitable acidic vinyl monomers {hereafter abbreviated as (a-3)} for the production of this vinyl polymer (II) include (meta) acrylic acid, crotonic acid, maleic acid, itaconic acid, half esters of maleic acid and alkyl alcohols containing between 1 and 10 carbon atoms, half esters of itaconic acid and alkyl alcohols containing between 1 and 10 carbon atoms, fumaric acid, or half esters of fumaric acid and alkyl alcohols containing between 1 and 10 carbon atoms, citraconic acid, 4-vinyl benzoic acid, cinnamic acid, succinic acid mono 2-(meta) acrylol oxyethyl ester, phthalic acid 2-(meta) acryloyl oxyethyl ester; the various mono vinyl esters of multi carboxylic acids such as malonic acid, adipic acid and sebacic acid; the various vinyl monomers containing phosphoric acid functionality such as mono{2-(meta) acryloyl oxyethyl} acid phosphate; and the various vinyl monomers containing sulfonic acid functionality such as p-vinyl benzenesulfonic acid, 2-(meta) acryloyl oxyethanesulfonic acid, 3-(meta) acryloyl oxypropanesulfonic acid, and 2-acrylylamido-2-methylpropanesulfonic acid.

Among these, the use of monomers containing carboxylic acid functionality is desirable, and (meta) acrylic acid is particularly suitable.

Furthermore, other copolymerisable vinyl monomers which can be used in the production of the vinyl polymer (II) include the various vinyl monomers (a-2) previously mentioned in the discussion regarding production of vinyl polymer (I).

The use of solvents and initiators in the production of the vinyl polymer (II) from the various aforementioned monomers, follows the same pattern as is described for production of vinyl polymer (I).

A vinyl polymer (II) containing both tertiary amino and acidic groups produced in this way should contain between about 0.03 and 2.5 moles of tertiary amino groups per 1000 grams of solid material, with between 0.05 and 1.5 moles being preferable, and between 0.05 and 0.5 moles being most suitable.

Furthermore, it should contain between about 0.07 and 5.0 moles of acidic groups, with between 0.07 and 2.0 moles being preferable, and between 0.1 and 0.7 moles being most suitable. Moreover, the average molecular weight for the polymer (II) should generally be in the range 500–100,000, and preferably in the range 1000–30,000.

Furthermore, in cases where hydroxyl functionality is introduced into the vinyl polymer (II) containing both tertiary amino and acidic groups, by for example using a monomer containing a hydroxyl group as a comonomer, then the curability of this invention's final composition, which will contain the water based product (C) formed from this polymer (II) as the constituent necessary for the formation of the coating film, can be improved one step, producing a coating film which has even better external appearance, even better resistance to solvents, and an even greater level of hardness.

In those instances where hydroxyl functionality is introduced into the vinyl polymer (II) containing both tertiary amino and acidic groups, then 1000 grams of solid material should contain between 0.04 and 2 moles, and preferably between 0.08 and 1.2 moles of hydroxyl groups.

By adding an acidic compound to the vinyl polymer (II) containing both tertiary amino and acidic groups formed by the method mentioned above, the tertiary amino groups in the polymer are partially, or completely neutralised, and a polymer which is soluble, or dispersible in water is generated.

The acidic compound used in this step can be any of the acidic compounds mentioned previously as being suitable in the production of the water based product (A), but of these, carboxylic acids are the most suitable.

The quantity of acidic compound to be added to the polymer, should be sufficient to ensure that the molar ratio of acidic groups in the added acidic compound to tertiary amino groups in the vinyl polymer (II) is at least 0.1. A ratio of between 0.1 and 3 is preferred, and a ratio of between 0.1 and 2 is most suitable.

The previously mentioned water based product (C), can be generated from the thus produced neutralised vinyl polymer (II) produced by this method, by the same methods outlined above for producing the water based product (A) from the neutralised vinyl polymer (I).

Next, we will explain the previously mentioned water based product (D), obtained by dispersing or dissolving in water, a vinyl polymer (II) containing both tertiary amino and acidic functionalities to which has been added sufficient basic compound so that the molar ratio of basic functionalities in the added basic compound to acidic functionalities in the vinyl polymer (II) is at least 0.1.

Firstly, the vinyl polymer (II) containing both tertiary amino and acidic functionalities can be produced by the method already described in the discussion concerning the production of water based product (C).

Furthermore, in cases where hydroxyl functionality is introduced into the vinyl polymer (II) containing both tertiary amino and acidic groups, by for example using a monomer containing a hydroxyl group as a comonomer, then the curability of this invention's final composition, which will contain the water based product (D) formed from this polymer (II), can be improved one step, producing a coating film which has even better external appearance, even better resistance to solvents, and an even greater level of hardness. In those instances where hydroxyl functionality is introduced into the vinyl polymer (II) containing both tertiary amino and acidic groups, then 1000 grams of solid material should contain between 0.04 and 2 moles, and preferably between 0.08 and 1.2 moles of hydroxyl groups.

By adding a basic compound to the vinyl polymer (II) containing both tertiary amino and acidic groups formed by the method mentioned above, the acidic groups in the polymer are partially, or completely neutralised, and a polymer which is soluble, or dispersible in water is generated.

Particularly representative examples of basic compounds which can be used in this instance include the various organic amines such as methyl amine, dimethyl amine, trimethyl amine, ethyl amine, diethyl amine, triethyl amine, n-butyl amine, tri-n-butyl amine, 2-amino-2-methyl propanol, 2-amino ethanol, and 2-dimethylamino ethanol; the various inorganic basic compounds beginning with ammonia, and including sodium hydroxide and potassium hydroxide; and quaternary ammonium hydroxides such as tetramethyl ammonium hydroxide, tetrabutyl ammonium hydroxide, trimethyl benzyl ammonium hydroxide.

Among the basic compounds listed, ammonia or the various organic amines are particularly suitable.

The quantity of basic compound to be added to the polymer, should be sufficient to ensure that the molar ratio of basic groups in the added basic compound to acidic groups in the vinyl polymer (II) is at least 0.1. A ratio of between 0.1 and 3 is preferred, and a ratio of between 0.1 and 2 is most suitable.

In order to prepare the water based product (D) from the thus formed mixture of vinyl polymer (II) and basic compound, the same methods outlined above for producing the water based product (A) from the neutralised vinyl polymer (I) can be used.

Next, we will explain the previously mentioned water based product (E), obtained by dispersing or dissolving in water, an acidic vinyl polymer (III) which has been partially or completely neutralised by a basic compound.

This acidic vinyl polymer (III) can be produced by various standard means. For example, (7) an acidic vinyl monomer can be copolymerised with other co-polymerisable vinyl monomer, (8) a vinyl monomer having hyroxy group can be reacted with a dicarboxylic acid anhydride, or (9) as was described previously, a vinyl monomer with a blocked acidic functionality can be copolymerised with other suitable vinyl polymer, and the blocked acidic functionality then converted to a free acid functionality.

Of these methods, method (7) is recommended as it is the simplest and most convenient.

The acidic vinyl monomer required to produce the acidic vinyl polymer (III) by method (7) above, can of course be any of the various acidic vinyl monomers (a-3) mentioned previously as suitable monomers for the production of the vinyl polymer (II) containing both tertiary amino and acidic groups.

Of these, monomers containing carboxylic acid functionality are particularly suitable.

Furthermore, other copolymerisable vinyl monomers which can be used in the production of the vinyl polymer (III) include, of course, the various vinyl monomers (a-2) previously mentioned in the discussion regarding production of vinyl polymer (I).

Similar solvents, initiators and procedure used in the production of the vinyl polymer (III) are selected, respectively from the representatives mentioned earlier in this invention for production of vinyl polymer (I).

A vinyl polymer (III) produced in this way should contain between about 0.07 and 5.0 moles of acidic groups per 1000 grams of solid material, with between 0.3 and 2.0 moles being preferable. Furthermore, the average molecular weight for the vinyl polymer (III) should generally be in the range 500–100,000, and preferably in the range 100–30,000.

Moreover, in cases where hydroxyl functionality is introduced into the acidic vinyl polymer (III), by for example using a monomer containing a hydroxyl group as a comonomer, then the curability of this invention's final composition, which will contain the water based product (F) formed from this polymer (III) as the constituent necessary for the formation of the coating film, can be improved one step, producing a coating film which has even better external appearance, even better resistance to solvents, and an even greater level of hardness.

In those instances where hydroxyl functionality is introduced into the acidic vinyl polymer (III), then 1000 grams of solid material should contain between 0.04 and 2 moles, and preferably between 0.08 and 1.2 moles of hydroxyl groups.

By adding a basic compound to the acidic vinyl polymer (III) prepared by the method mentioned above, the acidic groups in the polymer (III) are partially, or completely neutralised, and then a polymer which is soluble or dispersible in water is generated.

The basic compound used in this step can, of course, be any of the compounds mentioned previously as being suitable in the production of the water based product (D), but among them, ammonia and organic amines are suitable.

The quantity of basic compound to be added to the polymer, should be sufficient to ensure that the molar ratio of basic groups in the added basic compound to acidic groups in the vinyl polymer (III) is at least 0.1. A ratio of between 0.1 and 3 is preferred, and a ratio of between 0.1 and 2 is most suitable.

In order to prepare the water based product (E) from the thus formed mixture of vinyl polymer (III) and basic compound, the similar way outlined above for producing the water based product (A) from the neutralised vinyl polymer (I) may be used.

Representative examples of the previously mentioned compound (B), which contains both epoxy and hydrolysable silyl groups in the one molecule, include vinyl polymers with both these types of reactive functionality, silane coupling reagent which contains epoxy functionality, and silicone resins with both types of reactive functionality.

Hydrolysable silyl functionality here, refers to groups of atoms which contain a silicon atom which is bonded to, for example, a halogen atom, or an alkoxy, substituted alkoxy, phenoxy, isopropenyloxy, acyloxy or iminooxy functionality, and which are easily hydrolysable to form a silanol functionality. Particularly representative examples include the alkoxy silyl, phenoxy silyl, halo silyl, isopropenyloxy silyl, acyloxy silyl, and iminooxy silyl groups.

Any of the standard methods can be used to produce the vinyl polymers containing these two reactive groups, but the recommended methods include; (i) a solution radical copolymerisation of a vinyl monomer containing a hydrolysable silyl functionality such as γ-(meta) acryloyl oxy propyl trimethoxy silane, γ-(meta) acryloyl oxy propyl methyl dimethoxy silane, γ-(meta) acryloyl oxy propyl triisopropenyloxy silane, γ-(meta) acryloyl oxy propyl triiminooxy silane, vinyl trimethoxy silane, vinyl triethoxy silane, vinyl (tris-β-methoxy ethoxy) silane, vinyl triacetoxy silane, or vinyl trichloro silane, with a vinyl monomer containing an epoxy functionality such as glycidyl (meta) acrylate, (β-methyl) glycidyl (meta) acrylate, 3,4-epoxy cyclohexyl (meta) acrylate, aryl glycidyl ether, 3,4-epoxy vinyl cyclohexane, di (β-methyl) glycidyl maleate, or (β-methyl) glycidyl fumarate, where, if necessary, solution radical copolymerisation with the various aforementioned vinyl monomers (a-2) may also be employed, or alternatively, (ii) a solution radical (co)polymerisation of a mixture of monomers which must include one of the various epoxy vinyl monomers mentioned above, in the presence of one of various chain transfer agents which include a hydrolysable silyl functionality, such as γ-mercapto propyl trimethoxy silane, γ-mercapto propyl triethoxy silane, γ-mercapto propyl methyldimethoxy silane, γ-mercapto propyl triisopropenyloxy silane, or γ-mercapto propyl triiminooxy silane. Alternatively a combination of the two methods, (i) and (ii) may be used.

Particularly representative examples of the epoxy silane coupling reagent mentioned above include various epoxy silane compounds such as γ-glycidoxy propyl trimethoxy silane, γ-glycidoxy propyl triethoxy silane, γ-glycidoxy propyl methyl dimethoxy silane, γ-glycidoxy propyl methyl diethoxy silane, β-(3,4-epoxy cyclohexyl) ethyl trimethoxy silane, β-(3,4-epoxy cyclohexyl) ethyl methyl diethoxy silane, γ-glycidoxy propyl triisopropenyloxy silane, γ-glycidoxy propyl triiminooxy silane; the addition products of various isocyanato silane compounds, such as γ-isocyanato propyl triisopropenyloxy silane or γ-isocyanato propyl trimethoxy silane with glycidol; the addition products of various amino silane compounds, such as γ-aminopropyl trimethoxy silane with diepoxy compounds; or compounds which contain two or more hydrolysable silyl groups and two or more epoxy groups in a molecule, formed by a partial hydrolysis condensation of the various epoxy silane compounds mentioned above.

Particularly representative examples of the aforementioned silicone resins which contain both epoxy and hydrolysable silyl groups are the cyclic tetra siloxanes, an example of which is shown below.

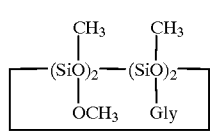
[I]

(Note, the Gly in this diagram represents a 3-glycidoxy propyl functionality)

In the production of the particular curable resin composition for use in water based paint, detailed in this invention, which contains the aforementioned water based product (A) and compound (B) containing both epoxy and hydrolysable silyl groups, as the base resin constituents, the two constituents (A) and (B) should be mixed together in a proportion that will yield to typical values for the molar ratio of the number of moles of tertiary amino groups in the water based product (A), to the number of moles of epoxy groups in compound (B) {hereafter also described as the molar ratio [tertiary amino groups in water based product (A)/epoxy groups in compound (B)]} of between about 0.1 and 5.0, with a ratio of between 0.3 and 3.0 being preferable, and a ratio of between 0.5 and 2.0 being most suitable.

Furthermore, in the production of the particular curable resin composition for use in water based paint, detailed in this invention, which contains either of the aforementioned water based products (C) or (D) and compound (B), containing both epoxy and hydrolysable silyl groups as the necessary base resin constituents, the two constituents (C) and (B), or alternatively (D) and (B) should be mixed together in a proportion that will yield typical values for the molar ratio [functionalities (namely, tertiary amino+acidic functionalities) in water based product (C) or (D)/epoxy functionalities in compound (B)] of between about 0.1 and 5.0, with a ratio of between 0.3 and 3.0 being preferable, and a ratio of between 0.5 and 2.0 being most suitable.

In the production of the particular composition, detailed in this invention, which contains the water based product (E) and compound (B) containing both epoxy and hydrolysable silyl functionalities as the necessary base resin constituents, the two constituents (E) and (B) should be mixed together in a proportion that will yield to typical values for the molar ratio [acidic functionalities in water based product (E)/epoxy functionalities in compound (B)] of between about 0.1 and 5.0, with a ratio of between 0.3 and 3.0 being preferable, and a ratio of between 0.5 and 2.0 being most suitable.

According to another aspect of this invention, addition of a compound (F), which contains a hydrolysable silyl functionality and/or a silanol functionality, but excludes the compound (B) which contain both epoxy and silyl functionalities, the weather resistance of the cured coating film obtained is improved, as is the hardness of the surface.

Particularly representative examples of this compound (F), containing a hydrolysable silyl functionality and/or a silanol functionality are silicate compounds such as methyl silicate, ethyl silicate, isopropyl silicate, and n-butyl silicate; various trifunctional silane compounds such as methyl trimethoxy silane, phenyl trimethoxy silane, methyl triethoxy silane, phenyl triethoxy silane, and isobutyl trimethoxy silane; various difunctional silane compounds such as dimethyl dimethoxy silane, dimethyl diethoxy silane, diethyl diethoxy silane, diphenyl dimethoxy silane; low molecular weight silanol compounds obtained by virtually complete hydrolysis of the trifunctional and difunctional silane compounds mentioned above, or of the various halo silanes such as methyl trichloro silane, phenyl trichloro silane, ethyl trichloro silane, dimethyl dichloro silane, and diphenyl dichloro silane; linear or cyclic polysiloxanes containing silanol functionality, obtained by carrying out a dehydration condensation on the silanol compounds mentioned above; and linear or cyclic polysiloxanes containing alkoxysilyl functionality, obtained by carrying out a partial hydrolysis condensation on at least one of the compounds from the group of aforementioned difunctional and trifunctional silane compounds and silicate compounds.

Concerning the amount of aforementioned compound (F), containing hydrolysable silyl and/or silanol functionality, which should be further added to each of the resin compositions comprising compound (B) containing both epoxy and hydrolysable silyl functionalities, and the various water based products (A), (C), (D) or (E), to provide the curable resin compositions for use in water based paint described in this invention, then for each 100 parts, by weight, of the solid component of the resins from water based products (A), (C), (D) or (E), between 0.5 and 200 parts, by weight, of the compound (F) should be added, with between I and 100 parts being preferable.

Furthermore, if necessary, a curing catalyst (G) may be added to the curable resin compositions for use in water based paint described in this invention. Addition of such a catalyst results in an improvement in the curability of the compositions.

Representative examples of this catalyst (G) include various basic compounds such as lithium hydroxide, sodium hydroxide, potassium hydroxide, and sodium methylate; various metallic compounds such as tetraisopropyl titanate, tetra n-butyl titanate, tin octylate, lead octylate, cobalt octylate, zinc octylate and calcium octylate, zinc naphthenate and cobalt naphthenate, di n-butyl tin diacetate, di n-butyl tin dioctoate, di n-butyl tin dilaurate and di n-butyl tin maleate; and various acidic compounds such as p-toluenesulfonic acid, trichloroacetic acid, monoalkyl phosphoric acids, dialkyl phosphoric acids, monoalkyl phosphorous acids and dialkyl phosphorous acids.

Furthermore, if required, various additives may be added to the curable resin compositions for use in water based paint, described in this invention. Such additives include various coalescing agents such as isopropyl alcohol, sec-butanol, n-butanol, 2-ethyl hexanol, 2-propoxy ethanol, 2-n-butoxy ethanol, 2-n-propoxy propanol, 3-n-propoxy propanol, 2-n-butoxy propanol, 3-n-butoxy propanol, 2-n-butoxy ethyl acetate, diethylene glycol monobutyl ether, N-methyl pyrrolidone, 2,2,4-trimethyl-1,3-pentanediol monobutarate, dibutyl phthalate ester and butyl benzyl phthalate ester, anti-foaming reagents, organic pigments, inorganic pigments, plasticizers, antioxidants, UV absorber, photostabilising reagents, leveling reagents, anti-streaking reagents, dispersing reagents and thickening reagents.

When using the curable resin compositions for use in water based paints described in this invention, and outlined above, a so called two component system is used with the constituent compound (B) containing both epoxy and hydrolysable silyl functionalities, being mixed with the other constituents immediately before use. The mixture should then be used within one day (24 hours), with use inside of 12 hours being preferable. Particular care needs to be taken in this respect, as if left for more than one day, the room temperature curability of the composition decreases markedly.

The curable compositions for use in water based paints described in this invention can be used, with conventional methods, to paint various surfaces, and then either dried at ambient temperature for between 1 and 10 days, force dried at between 40 and 100° C. for between 1 and 60 minutes, or bake dried at between 100 and 180° C. for between 1 and 60 minutes. This process emits very little organic solvent into the atmosphere and provides a coating film that has excellent weather resistant and curability properties, and excellent resistance to solvents, chemicals and water.

The curable resin compositions for use in water based paints described in this invention then, are novel and yet highly practical, contain no, or very little, organic solvent when compared with current organic solvent based paints, and yield a cured surface which has excellent weather resistant and curability properties as well as excellent resistance to solvents, chemicals and water.

Consequently, these curable resin compositions for use in water based paints, which yield such excellent cured surfaces, are suitable for a wide range of uses, including the painting of new vehicles, the repair of vehicles, woods, building, the painting of roof tiles, building materials, glass and various goods manufactured from plastics, and further, in the painting of a variety of metallic materials such as aluminum, stainless steel, chrome plating, corrugated iron and tinned sheet iron.

EXAMPLES

Next, we will attempt to explain the invention in more concrete terms, by giving reference, working and comparative examples. Note, however that this in no way implies that the invention is limited to the examples illustrated. Unless specified otherwise, reference in these examples to 'parts' or 'percentages' refers to relative weights.

Reference Example 1 [example of the production of a tertiary amino vinyl polymer (I)]

660 parts of ethylene glycol monoisopropyl ether was placed in a reaction vessel fitted with a stirrer, a thermometer, a reflux condenser and a nitrogen gas inlet, and the temperature raised to 80° C., under nitrogen gas atmosphere.

Next, a mixture of 100 parts styrene, 250 parts methyl methacrylate, 480 parts n-butyl methacrylate, 70 parts ethyl acrylate, 100 parts dimethyl aminoethyl methacrylate, 8 parts of azobis isobuturonitrile, and 5 parts tert-butyl peroxy octoate (TBPO) was dripped in slowly over a period of 4 hours.

On completion of this addition, the temperature was maintained for a further 10 hours. The product thus obtained was a solution of the targeted tertiary amino vinyl polymer (I) (average molecular weight 9,500) with a non volatile component of 60%. Hereafter this polymer is abbreviated as polymer (I-1).

Reference Example 2 [example of the production of the water based product (A)]

1.0 part of an 88% water solution of formic acid was added, at room temperature, to 100 parts of the polymer (I-1) obtained in reference example 1, and the mixture stirred. In this instance a 50% neutralisation rate was obtained.

Next, a further 49 parts of water were added, and stirring continued until a uniform mixture was obtained. The product thus obtained was the targeted water based product, and had a non volatile component of 40%. Hereafter this product is abbreviated as water based product (A-1).

Reference Example 3 [example of the production of the water based product (A)]

2 parts of an 88% water solution of formic acid was added, at room temperature, to 100 parts of the polymer (I-1) obtained in reference example 1, and the mixture stirred. In this instance a 100% neutralisation rate was obtained.

Next, a further 98 parts of water were added, and stirring continued until a uniform mixture was obtained. The product thus obtained was the targeted water based product, and had a non volatile component of 30%. Hereafter this product is abbreviated as water based product (A-2).

Reference Example 4 [example of the production of a tertiary amino vinyl polymer (I)]

Following the standard method, the polymerisation reaction was carried out with a mixture of 100 parts styrene, 700 parts n-butyl methacrylate, 100 parts ethyl acrylate, 50 parts 2-hydroxy ethyl acrylate and 50 parts dimethyl aminoethyl methacrylate as the monomers, as well as 8 parts azobis isobuturonitrile, and 5 parts tert-butyl peroxy octoate (TBPO), present as polymerisation initiators. This mixture of solvent, monomers, and polymerisation initiators was dripped in slowly over a period of 4 hours.

After the completion of this addition, the temperature was maintained for a further 10 hours. The product thus obtained was a solution of the targeted tertiary amino vinyl polymer (I) (average molecular weight 9,000) with a non volatile component of 60%. Hereafter this polymer is abbreviated as polymer (I-2).

Reference Example 5 [example of the production of the water based product (A)]

1.0 part of an 88% water solution of formic acid was added, at room temperature, to 100 parts of the polymer (I-2) obtained in reference example 4, and the mixture stirred. In this instance a 100% neutralisation rate was obtained.

Next, a further 49 parts of water were added, and stirring continued until a uniform mixture was obtained. The product thus obtained was the targeted water based product, and had a non volatile component of 40%. Hereafter this product is abbreviated as water based product (A-3).

Reference Example 6 [example of the production of a tertiary amino vinyl polymer (I)]

Following the standard method, the polymerisation reaction was carried out using a mixture of 660 parts isopropyl alcohol as solvent, 100 parts styrene, 700 parts n-butyl methacrylate, 100 parts ethyl acrylate, and 100 parts dimethyl aminoethyl methacrylate as the monomers, as well as 8 parts azobis isobuturonitrile, and 5 parts tert-butyl peroxy octoate (TBPO), present as polymerisation initiators. This mixture of solvent, monomers, and polymerisation initiators was dripped in slowly over a period of 4 hours.

After the completion of this addition, the temperature was maintained for a further 10 hours. The product thus obtained was a solution of the targeted tertiary amino vinyl polymer (I) (average molecular weight 9,000) with a non volatile component of 60%. Hereafter this polymer is abbreviated as polymer (I-3).

Reference Example 7 [example of the production of the water based product (A)]

1.1 parts of acetic acid was added, at room temperature, to 100 parts of the polymer (I-3) obtained in reference example 6, and the mixture stirred. In this instance a 50% neutralisation rate was obtained.

Next, a further 90 parts of water were added, and stirring continued until a uniform mixture was obtained. After this the mixture was heated to 30° C. to 40° C. and the isopropyl alcohol removed under reduced pressure. The product thus obtained was the targeted water based product, and had a non volatile component of 40%. Hereafter this product is abbreviated as water based product (A-4).

Reference Example 8 [example of the production of a vinyl polymer (II) containing both tertiary amino and acidic functionalities]

Using a mixture of 100 parts styrene, 250 parts methyl methacrylate, 440 parts n-butyl methacrylate, 150 parts ethyl acrylate, 40 parts dimethyl aminoethyl methacrylate, and 20 parts acrylic acid as the monomers, as well as 10 parts TBPO as the polymerisation initiator, and otherwise carrying out the reaction in an identical manner to that described in reference example 1 above, a solution of the targeted vinyl polymer (II) containing both tertiary amino and acidic functionalities (average molecular weight 8,000) with a non volatile component of 60% was obtained. Hereafter this polymer is abbreviated as polymer (II-1).

Reference Example 9 [example of the production of the water based product (C)]

0.8 parts of an 88% water solution of formic acid was added, at room temperature, to 100 parts of the polymer (II-1) obtained in reference example 8, and the mixture stirred.

Next, a further 49.2 parts of water were added, and stirring continued until a uniform mixture was obtained. The product thus obtained was the targeted water based product, and had a non volatile component of 40%. Hereafter this product is abbreviated as water based product (C-1).

Reference Example 10 [example of the production of the water based product (D)]

1.7 parts of triethyl amine were added, at room temperature, to 100 parts of the polymer (II-1) obtained in reference example 8, and the mixture stirred. 48.7 parts of water were then added and stirring continued until a uniform dispersion was obtained. The product thus obtained was the targeted water based product, and had a non volatile component of 40%. Hereafter this product is abbreviated as water based product (D-1).

Reference Example 11 [example of the production of a vinyl polymer (II) containing both tertiary amino and acidic functionalities]

Using a mixture of 100 parts styrene, 250 parts methyl methacrylate, 340 parts n-butyl methacrylate, 150 parts ethyl acrylate, 100 parts 2-hydroxyethyl acrylate, 40 parts dimethyl aminoethyl methacrylate, and 20 parts acrylic acid as the monomers, as well as 10 parts TBPO as the polymerisation initiator, and otherwise carrying out the reaction in an identical manner to that described in reference example 1 above, a solution of the targeted vinyl polymer (II) containing both tertiary amino and acidic functionalities (average molecular weight 8,000) with a non volatile component of 60% was obtained. Hereafter this polymer is abbreviated as polymer (II-2).

Reference Example 12 [example of the production of the water based product (D)]

1.7 parts of triethyl amine were added, at room temperature, to 100 parts of the polymer (II-2) obtained in reference example 11, and the mixture stirred. 48.7 parts of water were then added and stirring continued until a uniform dispersion was obtained. The product thus obtained was the targeted water based product, and had a non volatile component of 40%. Hereafter this product is abbreviated as water based product (D-2).

Reference Example 13 [example of the production of a vinyl polymer (II) containing both tertiary amino and acidic functionalities]

Using a mixture of 666 parts isopropyl alcohol as solvent, 100 parts styrene, 690 parts n-butyl methacrylate, 127 parts ethyl acrylate, 33 parts dimethyl aminoethyl methacrylate, and 50 parts acrylic acid as the monomer mixture, and 10 parts TBPO as the polymerisation initiator, and otherwise carrying out the reaction in an identical manner to that described in reference example 1 above, a solution of the targeted vinyl polymer (II) containing both tertiary amino and acidic functionalities (average molecular weight 8,000) with a non volatile component of 60% was obtained. Hereafter this polymer is abbreviated as polymer (II-3).

Reference Example 14 [example of the production of the water based product (D)]

2.5 parts of triethyl amine were added to 100 parts of the polymer (II-3) obtained in reference example 13, and the mixture stirred. 69 parts of water were then added and stirring continued until a uniform dispersion was obtained.

Next, the mixture was heated to between 30 and 40° C. and the isopropyl alcohol, used as the polymerisation solvent, removed under reduced pressure. The product thus obtained was the targeted water based product, and had a non volatile component of 32%. Hereafter this product is abbreviated as water based product (D-3).

Reference Example 15 [example of the production of a vinyl polymer (III) containing acidic functionalities]

Using a mixture of 666 parts butyl alcohol as solvent, 200 parts styrene, 500 parts n-butyl methacrylate, 200 parts ethyl acrylate, and 100 parts acrylic acid as the monomer mixture, and 10 parts TBPO as the polymerisation initiator, and otherwise carrying out the reaction in an identical manner to that described in reference example 1 above, a solution of the targeted vinyl polymer (III) containing acidic functionalities (average molecular weight 8,000) with a non volatile component of 60% was obtained. Hereafter this polymer is abbreviated as polymer (III-1).

Reference Example 16 [example of the production of the water based product (E)]

1.8 parts of N,N dimethyl octyl amine were added to 100 parts of the polymer (III-1) obtained in reference example 15, and the mixture stirred. 96 parts of water were then added and stirring continued until a uniform dispersion was obtained. The product thus obtained was the targeted water based product, and had a non volatile component of 30%. Hereafter this product is abbreviated as water based product (E-1).

Reference Example 17 [example of the production of an acidic vinyl polymer (III)]

Using a mixture of 666 parts ethylene glycol mono isopropenyl ether as solvent, 150 parts styrene, 500 parts n-butyl methacrylate, 150 parts ethyl acrylate, 100 parts 2-hydroxyethyl acrylate, and 100 parts acrylic acid as the monomer mixture, and 10 parts TBPO as the polymerisation initiator, and otherwise carrying out the reaction in an identical manner to that described in reference example 1 above, a solution of the targeted acidic vinyl polymer (III) (average molecular weight 8,000) with a non volatile component of 60% was obtained. Hereafter this polymer is abbreviated as polymer (III-2).

Reference Example 18 [example of the production of the water based product (E)]

1.8 parts of N,N dimethyl octyl amine were added to 100 parts of the polymer (III-2) obtained in reference example 17, and the mixture stirred. 96 parts of water were then added and stirring continued until a uniform dispersion was obtained. The product thus obtained was the targeted water based product, and had a non volatile component of 30%. Hereafter this product is abbreviated as water based product (E-2).

Reference Example 19 [example of the production of a compound containing both epoxy and hydrolysable silyl functionalities (B)]

800 parts of toluene was placed in a similar reaction vessel to that described in reference example 1, and the temperature raised to 120° C. under a stream of nitrogen.

Next, a mixture of 416 parts lauryl methacrylate, 284 parts glycidyl methacrylate, 300 parts γ-methacryloyl oxy propyl trimethoxy silane and 40 parts TBPO was dripped in slowly over a period of 6 hours.

After the completion of this addition, the temperature was maintained for a further 10 hours. The product thus obtained was a solution of the targeted polymer, containing both epoxy and methoxy silyl functionalities (epoxy equivalence 1000) with a non volatile component of 50%. Hereafter this compound is abbreviated as compound (B-1).

Reference Example 20 [example of the production of a vinyl polymer containing both primary amino and acidic functionalities]

Using a mixture of 100 parts styrene, 250 parts methyl methacrylate, 425 parts n-butyl methacrylate, 120 parts ethyl acrylate, 55 parts methacrylic acid and 50 parts acrylic acid as the monomer mixture, n-butyl acetate as the solvent, and 10 parts TBPO as the polymerisation initiator, and otherwise carrying out the reaction in an identical manner to that described in reference example 1 above, a solution of the vinyl polymer to be used for comparative purposes was obtained. The non volatile component of the solution was 60%.

Next, the temperature was lowered to 40° C., 36.3 parts of propylene imine added, and the mixture allowed to react for 6 hours. At this point the acid value of the solid constituent of the resin had fallen to 37.4.

42 parts of triethyl amine were then added at room temperature and the mixture stir Next, 755 parts of water were added and stirring continued until a uniform dispersion was obtained. The product thus obtained was the water based product to be used for comparative purposes, and had a non volatile component of 40%. Hereafter this product is referred to as the comparative resin.

Working Examples 1–12 and Comparative Examples 1 and 2.

White paints made of the various resin compositions for use in water based paints were produced by mixing the various constituents in the ratios shown in Table 1.

Next, using a 6 mil applicator, each of the paints was applied to a zinc phosphate treated steel sheet; a steel sheet which had already been painted with a primer, constituted of an oil free alkyd resin and melamine resin, and then bake dried (i.e., a prepainted sheet); a slate sheet; and a polypropylene sheet, and then left to dry at ambient temperature for 7 days to produce a fully cured coating film.

The coating film applied to the polypropylene sheet was separated from the sheet and its gelling coefficient was measured, while the coating film applied to the prepainted steel sheet was submitted to the exposure test, for a period of two years, in the suburbs of Miyazaki city, after which time its weather resistance and resistance to pollution was evaluated. A summary of these results is also shown in Table 1.

TABLE 1

*Table 1 (1-1)

| | Working example 1 | Working example 2 | Working example 3 | Working example 4 |
|---|---|---|---|---|
| Water based product (A-1) | 100 | | | |
| Water based product (A-2) | | 100 | | |
| Water based product (A-3) | | | 100 | |
| Water based product (A-4) | | | | 100 |
| [R-930] | 24.2 | 18.5 | 22.6 | 23.8 |
| UV absorber | 0.8 | 0.6 | 0.8 | 0.8 |
| γ-GPTMS | 7.2 | 6.3 | 3.0. | 6.0 |
| DBTDL | 0.04 | 0.03 | 0.04 | 0.03 |
| TSL | | 20.0 | 20.0 | |
| Paint name | CC01 | CC02 | CC03 | CC04 |

*PAINT COMPOSION
[Table 1: footnotes]
[R-930] . . . abbreviation for [TIPAQUE R-930] [brand name for titanium oxide produced by Ishihara Sanngyo Kaisya Co., Ltd.]
UV absorber . . . a 1:1 mixture, by weight, of [TINUBIN 765] and [TINUBIN 384] (both brand names, produced by Cibageigy Ltd., Switzerland)
γ-GPTMS . . . abbreviation for γ-glycidoxy propyl trimethoxy silane
DBTDL . . . abbreviation for dibutyl tin dilaurate
TSL . . . abbreviation for a blend, in a molar ratio of 2:1, of the 2 silicate compounds [TSL8 178] and [TSL8 122] [produced by Toshiba Silicone Co., Ltd.]

*Table 1 (1-2)

| | Working example 1 | Working example 2 | Working example 3 | Working example 4 |
|---|---|---|---|---|
| Paint Name | CC01 | CC02 | CC03 | CC04 |
| Gelling coefficient (%) | 94 | 92 | 96 | 94 |
| Initiai Gloss (20°) | 80 | 80 | 87 | 78 |
| Pencil hardness | 2B | HB | H | 2B |
| Gloss retention coefficient, (%) | 66 | 76 | 77 | 62 |
| Solvent resistance | ○ | ○ | ◯ | ○ |
| Resistance to acidity | | | GOOD | |
| Resistance to alkalinity | | | GOOD | |
| Water resistance | | | GOOD | |
| Wet adhesion | 100 | 90 | 100 | 100 |
| Resistance to yellowing under heat (Δb) | 0.4 | 0.2 | 0.I | 0.4 |

*COATING FILM PROPERTIES
[Table 1: footnotes]
Gelling coefficient (%) . . . This percentage is calculated as 100 times the ratio of the weight of the paint film, having been separated from the material and then soaked in acetoile for 24 hours, to the weight of film prior to soaking in acetone
Pencil hardness . . . This refers to the hardness of [Mitsubishi Uni] pencil [brand name, produced by Mitsubishi Pencils Co., Ltd.] required to scratch the coating film.

TABLE 1-continued

Gloss retention coefficient (%) . . . This percentage value is calculated by the formula below. The higher this value, the greater the weather resistant properties of the coating film;
Gloss retention coefficient (%) = $G_1/G_0 \times 100$
[Note, in this formula $G_1$ refers to the 60° gloss value (the percentage of 60° incident light reflected) after 2 years exposure to the elements, and $G_0$ refers to the initial 60° gloss value.]
Solvent resistance . . . A piece of felt soaked in methyl ethyl ketone was placed on a sample of the paint film and weighted down with a 500 g weight. The felt was then rubbed back and forth over the paint surface 100 times and the external appearance of the coating film evaluated by eye.
The evaluation standards used are as follows.
∘ no change
◯ slight scratches visible
Δ marked loss in surface Gloss
X dissolution and loss of coating film
Resistance to acidity . . . A 5% water solution of sulfuric acid was dripped on to the film for a period of 24 hours, and the film then washed with water, and its external appearance evaluated by eye.
Resistatice to alkalinity . . . A 5% water solution of sodium hydroxide was dripped on to the film for a period of 24 hours, and the film then washed with water, and its external appearance evaluated by eye.
Water resistance . . . A sample of the paint film was soaked in warm water at 40° C. for a period of one week and the external appearance of the film then evaluated by eye.
Wet adhesion . . . Following soaking in warm water at 40° C. for a period of one week, a cross cut pattern, consisting of 11 horizontal and 11 vertical cuts at regular intervals, was made on die film's surface and a stripping test carried out using cellophane tape.
Resistance to yellowing under heat . . A paint film, cured for 7 days at room temperature, was placed on a sheet of white material and over baked at 80° C. for a period of one hour, at which point the yellowing of the film was measured. The value [b] refers to the difference in the measured value and that of the white material.

*Table 1 (2-1)

|  | Working example 5 | Working example 6 | Working example 7 | Working example 8 |
|---|---|---|---|---|
| Water based product (C-1) | 100 | | | |
| Water based product (D-1) | | 100 | | |
| Water based product (D-2) | | | 100 | |
| Water based product (D-3) | | | | 100 |
| [R-930] | 24.4 | 24.6 | 24.6 | 19.4 |
| UV absorber | 0.8 | 0.8 | 0.8 | 0.64 |
| γ-GPTMS | 7.6 | 7.6 | 7.6 | 5.8 |
| DBTDL | 0.04 | | | |
| TSL | | 10.0 | 10.0 | 10.0 |
| N-MP | 2.0 | 2.0 | 2.0 | 2.0 |
| Paint name | CC05 | CC06 | CC07 | CC08 |

*PAINT COMPOSITION
[Table 1: footnotes]
N-MP . . . abbreviation for N-methyl pyrrolidone.

*Table 1 (2-2)

|  | Working example 5 | Working example 6 | Working example 7 | Working example 8 |
|---|---|---|---|---|
| Paint Name | CC05 | CC06 | CC07 | CC08 |
| Gelling coefficient (%) | 89 | 90 | 96 | 88 |
| Initiai Gloss (20°) | 80 | 78 | 88 | 83 |
| Pencil hardness | 2B | B | H | 2B |
| Gloss retention coefficient (%) | 58 | 73 | 78 | 71 |
| Solvent resistance | ∘ | ∘ | ◯ | ∘ |
| Resistance to acidity | | | GOOD | |
| Resistance to alkalinity | | | GOOD | |
| Water iesistance | | | GOOD | |
| Wet adhesion | 98 | 100 | 100 | 85 |
| Resistance to yellowing under heat (Δb) | 0.1 | 0.1 | 0.1 | 0.1 |

*COATING FILM PROPERTIES

*Table 1 (3-1)

|  | Working example 9 | Working example 10 | Working example 11 | Working example 12 |
|---|---|---|---|---|
| Water based product (A-1) | 100 | 100 | | |
| Water based product (B-1) | | | 100 | |
| Water based product (E-2) | | | | 100 |
| [R-930] | 28.2 | 23.8 | 19.6 | 19.6 |
| UV absorber | 1.0 | 0.8 | 0.6 | 0.6 |
| γ-GPTMS | | | 6.0 | |
| γ-GPMDMS | | | | 8.0 | 8.0 |
| Polymer (B-1) | 25.0 | | | |
| DBTDL | 0.04 | | | |
| SH-6018 | 2.0 | 2.0 | 2.0 | 2.0 |
| Paint name | CC09 | CC10 | CC11 | CC12 |

*PAINT COMPOSITION
[Table 1: footnotes]
γ-GPMDMS . . . Abbreviation for γ-glycidoxy propyl methyl dimethoxy silane.
[SH-6018] . . . Abbreviation for [Toray Silicone SH-6018] a silicone compound produced by Toray Silicone Co., Ltd.

*Table 1 (3-2)

|  | Working example 9 | Working example 10 | Working example 11 | Working example 12 |
|---|---|---|---|---|
| Paint Name | CC09 | CC10 | CC11 | CC12 |
| Gelling coefficient (%) | 95 | 92 | 94 | 96 |
| Initial Gloss (20°) | 72 | 80 | 80 | 87 |
| Pencil hardness | 4B | 2B | F | 2H |
| Gloss retention coefficient (%) | 63 | 74 | 58 | 69 |
| Solvent resistance | ∘ | ∘ | ◯ | ∘ |
| Resistance to acidity | | | GOOD | |
| Resistance to alkalinity | | | GOOD | |
| Water resistance | | | GOOD | |
| Wet adhesion | 100 | 100 | 80 | 70 |
| Resistance to yellowing under heat (Δb) | 0.3 | 0.3 | 0.1 | 0.1 |

*COATNG FILM PROPERTIES

*Table 1 (4-1)

|  | Comparative example 1 | Comparative example 2 |
|---|---|---|
| Polymer (I-1) | | 100 |
| Comparative resin | 100 | |
| Titanium Oxide R-930 | 26.2 | 35.7 |
| UV absorber | 0.8 | 1.2 |
| γ-GPTMS | 12.4 | 9.0 |
| DBTDL | 0.04 | 0.06 |
| N-MP | 2.0 | |
| Solvent mixture | | 43 |
| Paint name | CC'01 | CC'02 |

*PAINT COMPOSITION
[Table 1: footnotes]
Solvent mixture . . . This is a 70/30 mixture by weight, of toluene and n-butyl acetate.

*Table 1 (4-2)

|  | Comparative example 1 | Comparative example 2 |
|---|---|---|
| Paint Name | CC'01 | CC'02 |
| Gelling coefficient (%) | 80 | 95 |
| Pencil hardness | 2B | B |
| Gloss retention coefficient (%) | 20 | 66 |
| Solvent resistance | X | Δ |
| Resistance to acidity | GOOD | |
| Resistance to alkalinity | GOOD | |

TABLE 1-continued

| Water resistance | GOOD | |
|---|---|---|
| Wet adhesion | 0 | 100 |
| Resistance to yellowing under heat (Δb) | 0.2 | 3 |

*COATING FILM PROPERTIES

We claim:

1. A curable resin composition for use in water based paints comprising;
    a water based product (D) obtained by dispersing or dissolving in water, a vinyl polymer (II) containing both tertiary amino functionalities in an amount between 0.05 and 1.5 moles per 1000 grams of solid material and acidic functionalities in an amount between 0.07 and 2.0 moles per 1000 grams of solid material, to which has been added sufficient basic compound so that the molar ratio of basic functionalities in the added basic compound to acidic functionalities in the vinyl polymer (II) is at least 0.1, and
    a compound (B) containing both epoxy and hydrolysable silyl functionalities,
    wherein the molar ratio of the total of the tertiary amino functionalities and the acidic functionalities in the water based product (D) to the epoxy functionalities in the compound (B) is between 0.3 and 3.0.

2. A curable resin composition for use in water based paints comprising;
    a water based product (D) obtained by dispersing or dissolving in water, a vinyl polymer (II) containing both tertiary amino functionalities in an amount between 0.05 and 1.5 moles per 1000 grams of solid material and acidic functionalities in an amount between 0.07 and 2.0 moles per 1000 grams of solid material, to which has been added sufficient basic compound so that the molar ratio of basic functionalities in the added basic compound to acidic functionalities in the vinyl polymer (II) is at least 0.1,
    a compound (B) containing both epoxy and hydrolysable silyl functionalities, and
    a curing catalyst (G),
    wherein the molar ratio of the total of the tertiary amino functionalities and the acidic functionalities in the water based product (D) to the epoxy functionalities in the compound (B) is between 0.3 and 3.0.

3. A curable resin composition according to claim 1, wherein the number-average molecular weight of the vinyl polymer (II) is in the range of 1,000 to 30,000.

4. A curable resin composition according to claim 2, wherein the number-average molecular weight of the vinyl polymer (II) is in the range of 1,000 to 30,000.

5. A curable resin composition according to claim 1, wherein the ratio of the equivalent number of the basic functionalities in the basic compound to the equivalent number of the acidic functionalities in the vinyl polymer (II) is in the range of 0.1 to 3.0.

6. A curable resin composition according to claim 2, wherein the ratio of the equivalent number of the basic functionalities in the basic compound to the equivalent number of the acidic functionalities in the vinyl polymer (II) is in the range of 0.1 to 3.0.

* * * * *